United States Patent
Shimizu et al.

(10) Patent No.: US 7,125,918 B2
(45) Date of Patent: *Oct. 24, 2006

(54) PROTECTIVE FILM OF A POLARIZING PLATE

(75) Inventors: Kunio Shimizu, Yamanashi (JP); Toru Kobayashi, Akishima (JP)

(73) Assignee: Konica Corporation (JP)

( * ) Notice: Subject to any disclaimer, the term of this patent is extended or adjusted under 35 U.S.C. 154(b) by 550 days.

This patent is subject to a terminal disclaimer.

(21) Appl. No.: 10/131,416

(22) Filed: Apr. 22, 2002

(65) Prior Publication Data

US 2002/0160172 A1 Oct. 31, 2002

Related U.S. Application Data

(63) Continuation-in-part of application No. 10/004,385, filed on Nov. 1, 2001, now abandoned.

(30) Foreign Application Priority Data

Nov. 7, 2000 (JP) .............................. 2000-338883

(51) Int. Cl.
| | | |
|---|---|---|
| C09D 101/10 | (2006.01) | |
| C09D 101/12 | (2006.01) | |
| C09D 101/14 | (2006.01) | |
| C08J 7/04 | (2006.01) | |
| C08L 1/10 | (2006.01) | |
| C08L 1/12 | (2006.01) | |
| C08L 1/14 | (2006.01) | |
| C08L 1/20 | (2006.01) | |
| C08J 7/20 | (2006.01) | |

(52) U.S. Cl. ........................ 524/37; 524/38; 524/39; 106/162.7; 106/162.71; 106/162.72

(58) Field of Classification Search ................ 524/37, 524/38, 39; 106/162.7, 162.71, 162.72
See application file for complete search history.

(56) References Cited

U.S. PATENT DOCUMENTS

| 4,218,362 | A | * | 8/1980 | Honjo et al. ................ 524/409 |
| 4,262,040 | A | * | 4/1981 | Russo ........................ 427/229 |
| 5,202,188 | A | * | 4/1993 | Bekele ....................... 428/414 |
| 5,698,614 | A | * | 12/1997 | Ueda et al. ................. 523/161 |
| 5,753,140 | A | * | 5/1998 | Shigemura ............. 252/299.01 |
| 6,320,042 | B1 | * | 11/2001 | Michihata et al. ............ 536/69 |
| RE37,563 | E | * | 2/2002 | Cooprider et al. .......... 428/206 |
| 6,730,374 | B1 | * | 5/2004 | Gamble et al. ............. 428/1.54 |
| 6,844,033 | B1 | * | 1/2005 | Shimizu et al. ............ 428/1.33 |
| 2002/0086163 | A1 | * | 7/2002 | Shimizu et al. .......... 428/424.4 |

FOREIGN PATENT DOCUMENTS

| JP | 07020317 | * | 1/1995 |
| JP | 7020317 | * | 1/1995 |

* cited by examiner

*Primary Examiner*—Nathan M. Nutter
(74) *Attorney, Agent, or Firm*—Squire, Sanders & Dempsey L.L.P.

(57) ABSTRACT

A protective film of a polarizing plate comprising a cellulose ester film, wherein a variation in a weight of the cellulose ester film is 0 to 2% under a keeping condition of 80±5° C. and 90±10% RH for 48 hours.

4 Claims, No Drawings

PROTECTIVE FILM OF A POLARIZING PLATE

This application is a continuation-in-part application of U.S. patent application Ser. No. 10/004,385 filed Nov. 1, 2001, now abandoned.

FIELD OF THE INVENTION

The present invention relates to a protective film of a polarizing plate used for a liquid crystal display having superior dimension stability, and particularly to a polymer-containing protective film of a polarizing plate.

BACKGROUND OF THE INVENTION

A cellulose triacetate film has been used conventionally as a base film of silver halide photographic light sensitive materials. The cellulose triacetate film has also been applied to a protective film of a polarizing plate, but an additional property which is not required in silver halide photographic light sensitive materials is required for its use in the protective film. A plasticizer is contained in a cellulose acetate film used for a protective film of a polarizing plate, as in silver halide photographic light sensitive materials, for the purpose of providing flexibility and hydrophobicity to the film.

In recent years, developments have been made to the thinner and light-weight information processing apparatus equipped with a liquid crystal display, such as notebook personal computers, car navigation systems, cell phones and game devices. Requirements for a thinner protective film of a polarizing plate used in a liquid crystal display have become stronger in response to the above-mentioned trend. Therefore, the protective film of a polarizing plate tends to be made extremely thinner, compared to the base film for light sensitive silver halide photographic materials. A decrease of a film thickness results in lowered moisture-resistance, lowering performance of a liquid crystal display in high humidity, specifically under environments of high temperature and humidity.

Further, during the drying process after casting of the film, plasticizers may migrate in the thickness direction of the film web, resulting in inhomogeneous distribution of the plasticizer, and the plasticizer may bleed out onto the web surface or may be evaporated or vaporized to condense and be accumulated on the wall of the film-forming apparatus, forming liquid drops which contaminates the web or rolls. Simply decreasing a cellulose triacetate film thickness deteriorates moisture-resistance, leading to insufficient shield against moisture and deteriorating a polarizer or an adhesive used to adhere the polarizer to the cellulose triacetate film, after an assembly of a polarizing plate. To overcome such a problem, there appeared a proposal to increase the plasticizer in order to compensate for the decrease in film thickness. However, it was proved that a simple increase of the plasticizer accelerated bleeding-out of a plasticizer onto the surface of cellulose film and there took place a new problem in addition to those arising with silver halide photographic light sensitive materials. Additives such as a plasticizer often bleed out or evaporate out of the film under high temperature and high humidity to reduce the weight of the film. The property that such additives are retained within the film is called retainability. Retainability of conventional cellulose acetate films is poor, causing deterioration of performance of a liquid crystal display device.

An increase of a plasticizer further lowers the glass transition temperature (also denoted as $T_g$) of a cellulose triacetate film, producing problems like softening of the cellulose triacetate film and deteriorated dimensional stability of the film (including shrinkage ratio, coefficient of hygroscopic expansion and coefficient of thermal expansion).

To overcome the foregoing problems, a technique is disclosed, in which a polymer such as polyester, polyester ether, or polyurethane ether, is incorporated as a polymer plasticizer, optionally in combination with a low molecular weight plasticizer, as described, for example, in JP-B 47-760, 43-1635 (the term, JP-B refers to examined and published Japanese Patent), JP-A 5-197073 (the term, JP-A refers to unexamined and published Japanese Patent Application), and U.S. Pat. Nos. 3,054,673, 3,277,031. Further, a technique is also proposed, in which an acryl-type polymer or a polymer obtained by causing an acryl-type monomer to polymerize in the presence of cellulose triacetate is incorporated in a cellulose triacetate film. However, a polymer plasticizer caused phase separation between cellulose triacetate and the polymer in a cellulose triacetate dope, in the web during the drying process or after film formation, resulting in deteriorated transparency, increased water permeability, inhomogeneous shrinkage or lowered shrinkage rate of the film.

A first object of the present invention is to provide a cellulose ester film as a protective film of a polarizing plate which does not contaminate films or equipment because of elution, evaporation or vaporization of low molecular weight additives such as a plasticizer during the film production.

A second object of the present invention is to provide a cellulose ester film as a protective film of a polarizing plate exhibiting superior moisture-resistance, without deteriorating a polarizer even under high temperature or high temperature and high humidity.

SUMMARY OF THE INVENTION

The above objects can be accomplished by each of the following constitutions.

1. A protective film of a polarizing plate comprising a cellulose ester film, wherein a variation in a weight of the cellulose ester film is 0 to 2% under a keeping condition of 80±5° C. and 90±10% RH for 48 hours.

2. The protective film of a polarizing plate of item 1, wherein the cellulose ester film contains a plasticizer in an amount of 1 to 30 weight % of the cellulose ester film.

3. The protective film of a polarizing plate of item 1, wherein a moisture permeability of the cellulose ester film is 50 to 250 g/m²·24 hr and a thickness of the cellulose ester film is 10 to 60 μm.

4. A protective film of a polarizing plate comprising a cellulose ester film, wherein the cellulose ester film contains a plasticizer selected from the group consisting of rosin, rosin derivatives, epoxy resins, ketone resins and p-toluenesulfonamide resins.

5. The protective film of a polarizing plate of item 4, wherein the plasticizer is rosin or a rosin derivative.

6. The protective film of a polarizing plate of item 5, wherein the plasticizer is hydrogenated and has an acid value of 100 to 250.

7. The protective film of a polarizing plate of item 4, wherein the plasticizer is an epoxy resin.

8. The protective film of a polarizing plate of item 7, wherein the plasticizer is a phenol-novolac epoxy resin or a cresol-novolac epoxy resin.

9. The protective film of a polarizing plate of item 4, wherein the plasticizer is a ketone resin.

10. The protective film of a polarizing plate of item 4, wherein the plasticizer is a p-toluenesulfonamide resin.

11. The protective film of a polarizing plate of item 4, wherein a variation in a weight of the cellulose ester film is 0 to 2% under a keeping condition of 80±5° C. and 90±10% RH for 48 hours.

12. The protective film of a polarizing plate of item 1, wherein the cellulose ester film contains a plasticizer selected from the group consisting of rosin and rosin derivatives.

13. The protective film of a polarizing plate of item 12, wherein the plasticizer is hydrogenated and has an acid value of 100 to 250.

14. The protective film of a polarizing plate of item 1, wherein the cellulose ester film contains a plasticizer selected from epoxy resins.

15. The protective film of a polarizing plate of item 14, wherein the plasticizer is a phenol-novolac epoxy resin or a cresol-novolac epoxy resin.

16. The protective film of a polarizing plate of item 1, wherein the cellulose ester film contains a plasticizer selected from ketone resins.

17. The protective film of a polarizing plate of item 11, wherein the cellulose ester film contains a plasticizer selected from p-toluenesulfonamide resins.

DETAILED DESCRIPTION OF THE INVENTION

The present invention is further detailed below.

A cellulose triacetate film is applied to a protective film of a polarizing plate because of its good transparency, its freedom of optical strain (low retardation) and its excellent adhesion to a polarizer. It is common practice that a plasticizer is incorporated into the protective film of a polarizing plate in order to protect the polarizer layer and make a polarizer layer easier to be processed. Examples of plasticizers preferably incorporated are; phosphates such as, triphenyl phosphate, tricresyl phosphate, cresyl diphenyl phosphate, octyl diphenyl phosphate, diphenyl biphenyl phosphate, trioctyl phosphate and tributyl phosphate; phthalates such as diethyl phthalate, dimethoxyethyl phthalate, dimethyl phthalate, dioctyl phthalate, dibutyl phthalate and di-2-ethylhexyl phthalate; glycolates such as triacetin, tributyrin, butylphthtalybutyl glycolate, ethylphtahlylethyl glycolate, methylphthalylethyl glycolate and butylphthalylbutyl glycolate. However, a plasticizer tends to precipitate by vaporization of a solvent during the casting process due to poor miscibility with cellulose ester.

A plasticizer, which has a relatively low molecular weight, exhibiting a low boiling point, easily bleeds out during the drying stage of the production process, providing a main cause of contamination of production equipments.

A cellulose triacetate film has insufficient moisture-resistance, particularly poor moisture-resistance in thin films (not more than 60 μm).

In the present invention, the foregoing problems were solved by using rosin resin, epoxy resin, ketone resin and p-toluenesulfonamide resin as a plasticizer.

Examples of cellulose esters according to the invention are: cellulose triacetate, cellulose diacetate, cellulose acetate butyrate, cellulose acetate propionate and cellulose acetate propionate butyrate. As for cellulose triacetate, it is preferred to have a degree of polymerization of 250 to 400 and an acetic acid content of 54 to 62.5%, and more preferably 58 to 62.5% in terms of mechanical strength. Cellulose triacetate synthesized from cotton linter and that synthesized from wood pulp can be used each alone or in combination. It is more preferred to use cellulose triacetate synthesized from cotton linter, which exhibits superior peelability from a drum or belt, in terms of higher production efficiency. It is preferable to use cellulose triacetate synthesized from cotton linter at a ratio of not less than 60% by weight, and more preferably not less than 85% by weight, and it is still more preferable to use alone, in terms of the marked effect on the peelability.

The average polymerization degree of cellulose ester used in the invention is preferably 70,000 to 300,000, and more preferably 80,000 to 200,000, because an excessively low degree of polymerization may lower strength and an excessively high degree may excessively raise the viscosity of the solution.

As for exemplary preparation of cellulose acetate used in the invention, it can be synthesized by the method described, for example, in JP-A 10-45804. It is also possible to obtain a desired degree of substitution by mixing two or more kinds of substituted cellulose, which has been substituted in advance at a prescribed rate by each kind of acyl radicals.

Plasticizers usable in the invention preferably have an average molecular weight of not more than 1,000.

Examples thereof include rosin and rosin derivatives, epoxy resin, ketone resin and p-toluenesulfonamide resin.

Rosin and rosin derivatives include those of the following structures.

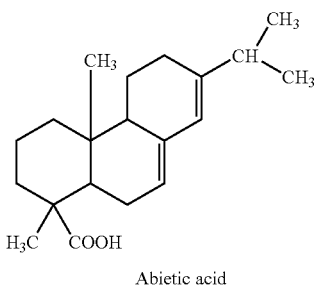

Abietic acid

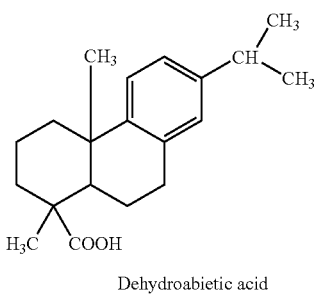

Dehydroabietic acid

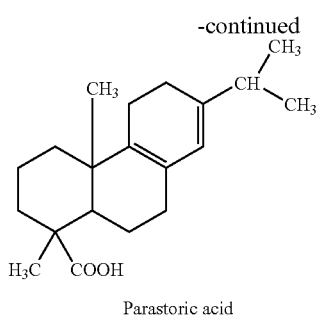

Parastoric acid

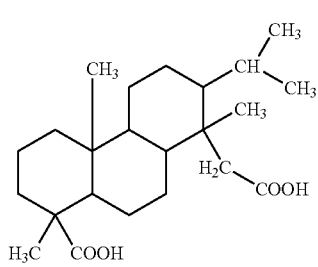

KE-604

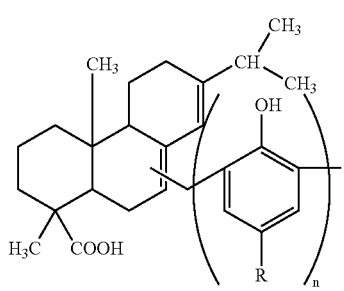

KE-610

Of these compounds, KE-604 and KE-610 are commercially available from Arakawa Kagaku Kogyo Co. Ltd., having acid values of 237 and 170, respectively. KE-100 and KE-356, which are esterification products of three-stuff mixtures of abietic acid, dehydroabietic acid and parastoric acid, are also commercially available from Arakawa Kagaku Kogyo Co. Ltd., as of acid values of 8 and 0 respectively. Mixtures of abietic acid, dehydroabietic acid and parastoric acid, are also available from Harima Kasei Co. Ltd., as G-7 and HARTALL Araldite EPN1179 and Araldite AER260 are commercially available from Asahi Ciba Co., Ltd.

Ketone resin includes those of the following structures.

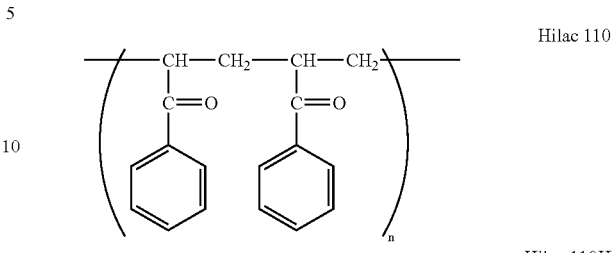

Hilac 110

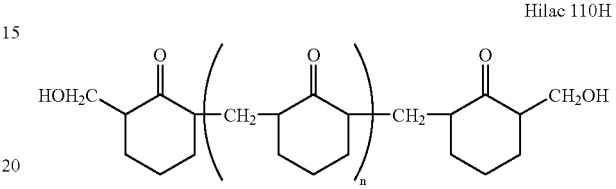

Hilac 110H

Hilac 110 and Hilac 110H are commercially available from Hitachi Kasei Co., Ltd.

p-toluenesulfonamide resins include those of the following structures and are also commercially available as Toplr from Fuji Amido Chemicals Co., Ltd.

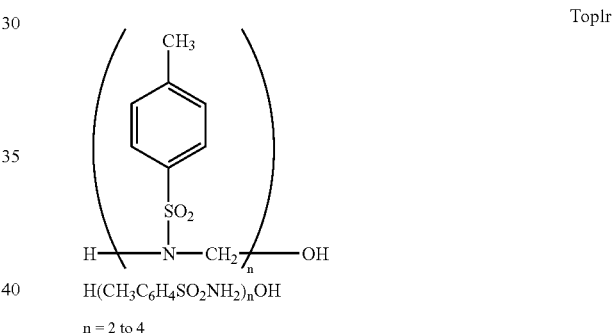

Toplr $H(CH_3C_6H_4SO_2NH_2)_nOH$ n = 2 to 4

A cellulose ester film used in the present invention preferably exhibits a variation in weight of 0 to 2%, and Araldite EPN1179

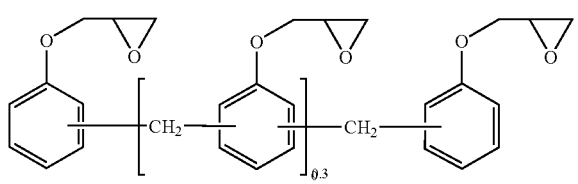

molecular weight: ca. 405

Araldite AER260

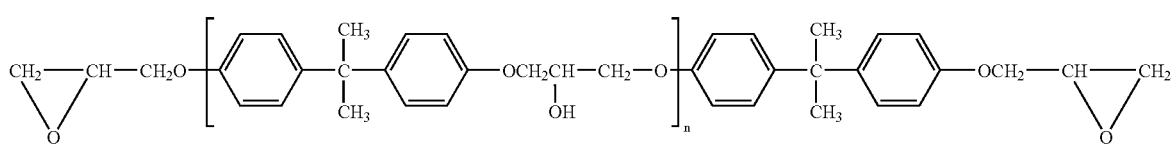

more preferably 0 to 1.5%, when it is aged under the atmosphere of 80±5° C. and 90±10% RH over a period of 48 hrs.

A cellulose ester film used in the invention preferably has a moisture permeability of 50 to 250 g/m²·24 hrs, and more preferably 50 to 200 g/m²·24 hrs. Water vapor permeability is measured according to the method described in JIS Z 0208.

A solvent for the cellulose ester dope and a plasticizer in the invention includes, for example, low molecular weight alcohols such as methanol, ethanol, n-propyl alcohol, isopropyl alcohol and n-butanol; cyclohexanedioxanes; low molecular weight alkyl hydrocarbon chlorides such as methylene chloride; ketones such as acetone and methylethylketone; and esters such as ethyl acetate and butyl acetate; and aromatic hydrocarbons such as toluene and xylene.

The proportion of solvents usable in the invention is preferably at 88 to 96% by weight of methylene chloride and 4 to 12 % of other solvent(s), and more preferably at 90 to 94% by weight of methylene chloride and 6 to 10% of other solvent(s).

Further, the concentration of a cellulose ester plus a plasticizer, based on the total amount of dope is preferably 15 to 30% by weight, and more preferably 18 to 25% by weight. The concentration of a cellulose ester plus the foregoing polymer is preferably 15 to 30% by weight, and more preferably 18 to 25% by weight, based on the total amount of dope.

The temperature of the heating dissolution with adding a solvent is preferably over the boiling point of the solvent used and within the temperature range of causing no boiling. The temperature is preferably set, for example, to not lower than 60° C. and more preferably in the range of 80 to 110° C. Pressure is set so that the solvent does not boil at the set temperature.

After completing dissolution, a dope is taken out of a vessel, while cooling, or discharged by a pump out of the vessel, followed by cooling through a heat-exchanger, to be fed to the casting process.

The invention is not limited to the preparation method of a cellulose ester film and several methods commonly known in the art are applicable, as described in U.S. Pat. Nos. 2,492,978, 2,739,070, 2,739,069, 2,492,977, 2,336,310, 2,367,603 and 2,607,704; British Patent 64071 and 735892; and JP-B 45-9074, 49-4554, 49-5614, 60-27562, 61-39890 and 62-4208.

Necessary additives other than the cellulose ester and solvents may be mixed with a solvent, and dissolved or dispersed, and then added into the solvent before cellulose ester is dissolved therein or added into the dope after cellulose ester has been dissolved therein.

The invention is also not limited to a pressure vessel, rather, the invention can include any one which can withstand a predetermined pressure and can also conduct heating and stirring under pressure. The pressure vessel may be equipped with measuring instruments such as a pressure gauge, thermometer, etc.

Pressure may be supplied by introducing an inert gas such as nitrogen with a pressure or increasing vapor pressure of a solvent by heating.

Heat is preferably supplied from outside of the vessel, such as a jacket-type vessel is preferred for easier control of temperature.

The dope may be cooled to room temperature, but more preferably to a temperature of 5 to 10° C. lower than the boiling point and fed to the casting process while keeping the temperature so that the viscosity of the dope can be lowered.

According to the invention, a dope prepared by dissolving a cellulose ester is cast onto a support (casting process); a part of the solvent is removed by heating (drying-on-support process); the film is peeled off from the support; and the peeled film is dried (film drying process) to obtain a cellulose ester film.

For the support in the casting process, mirror-polished stainless steel support of a belt-form or drum-form is used. Casting can be performed while the support is generally maintained within a temperature higher than 0° C. and lower than the boiling point of the solvent. In the casting process, casting onto the support at a temperature of 5 to 15° C. is more preferred, thereby gelling the dope and shortening the limiting peel-off time. Limiting peel-off time is defined as the duration of time that the cast dope stays on a support at the critical casting speed at which transparent and very flat film is continuously obtainable. To enhance production efficiency, a shorter limiting peel-off time is preferable.

In the process of drying a film on a support, after a dope is cast and gelled, the dope is maintained preferably at a temperature of 40 to 70° C., and more preferably at 55 to 70° C. within a time of 30% from the casting, based on the time duration from casting to peeling being 100%. Therefore, evaporation of the solvent is accelerated, enabling a film to be peeled from a support much faster and also increasing the peel strength of the film. This temperature is preferably maintained for a period of not less than 20%, and more preferably not less than 40%. The film is preferably peeled from the support in the drying process when the amount of residual solvent is 30 to 150%, more preferably 40 to 120%, and still more preferably 80 to 100%, thereby lowering the strength of peeling-off from the support. The temperature at which the dope is peeled from a support is preferably 0 to 30° C., and more preferably 5 to 20° C. to increase the base film strength and prevent tear-off of the base.

The residual solvent amount is defined according to the following equation:

Residual solvent amount={(Residual volatile matter weight)/(film weight after subjected to thermal treatment)}×100(%), wherein the residual volatile matter weight means the value equal to a film weight before being subjected to thermal treatment at 115° C. for 1 hr minus the film weight after being subjected to the thermal treatment.

In the film drying process, the film peeled from the support is further dried to lower the residual solvent amount to not more than 5% by weight, preferably not more than 2% by weight, and more preferably not more than 0.5% by weight, in order to obtain a film exhibiting superior dimensional stability. In the film drying process, the film is dried while being transported by means of a roll-hanger method, a pin-tenter method or a clip-tenter method. For use as a liquid crystal display member, a film is preferably dried by maintaining the film width by the tenter method to enhance dimension stability. Preferably, the film width is maintained while the film contains a relatively large amount of residual solvent immediately after peeled from the support, to display an enhanced effect of dimensional stability.

The width of the film tends to shrink after having been peeled from the support by evaporation of a solvent specifically in the drying process. Drying at a higher temperature results in greater shrinkage. It is preferred to perform drying with minimal shrinkage in the drying process to achieve superior film flatness. In this regard, the tenter method is preferred, in which the film is dried in whole or a part of the drying process, while maintaining its width by holding both width edges of the film with clips, such as described in JP-A 62-46625.

Means for drying the film are not specifically limited to the generally utilized means for drying such as hot air, infrared radiation, heated rolls and microwave. The hot air method is preferred in terms of simplicity. To enhance dimensional stability, the drying temperature is preferably raised stepwise in 3 to 5 steps within the range of between 40 and 150° C., and more preferably within the range of between 80 and 140° C.

These processes of from casting to post-drying may be performed in an atmosphere of air or an inert gas such as nitrogen. Drying is to be conducted in an atmosphere, taking into account of the explosion limit concentration of the solvent used.

A winder for production of a cellulose ester film according to the invention may be any winder commonly used. The film can be wound up by a constant tension method, constant torque method, tapered tension method or programmed tension control method to achieve a constant film interior stress.

The thickness of the cellulose ester film according to the invention is preferably 10 to 60 μm, and more preferably 30 to 50 μm, in terms of demand for a thin-walled and light-weight polarizing plate used in the liquid crystal display. When the thickness is less than this, troubles tend occur, caused by generation of wrinkle and the like in the process of preparing the liquid crystal display, while the thickness more than this results in little contribution to the liquid crystal display.

The cellulose ester film according to the invention, after being aged at 80° C. and 90% RH for 50 hrs. preferably exhibits a dimensional stability in both longitudinal and transverse directions of −0.5 to +0.5%, and more preferably −0.4 to +0.4%, and still more preferably −3 to +0.3%.

The cellulose ester film preferably exhibits a curl value of −20 to +40 (in 1/m), and more preferably −20 to +35, and still more preferably −20 to +25 at 23° C. and 80% RH.

The cellulose ester film preferably exhibits a curl value in 40° C. water of −20 to +60 (in 1/m), and more preferably −20 to +50, and still more preferably −20 to +40.

To a cellulose ester film according to the invention, fine particles such as silicon oxide as a matting agent may optionally be incorporated. The fine particles such as silicon oxide are preferably subjected to a surface treatment by an organic compound to minimize haze of the film. Preferred organic compounds used for the surface treatment include, for example, halosilanes, alkoxysilanes, silazane, and siloxane. The average primary particle size is preferably 5 to 50 nm and more preferably 7 to 14 nm since the larger the average particle size, the greater the matting effect, while the smaller the average particle size, the better the transparency. Examples of fine particles of silicone oxide include AERO-SIL 200, 200V, 300, R972, R974, R202, R812, OX50 and TT600, which are produced by Aerosil Co. Ltd., of which AEROSIL 200V, R972, R974, R202 and R812 are preferable.

The cellulose ester film according to the invention preferably contains minimal foreign matter. Preferably, it contains foreign matter detectable under the polarizing crossed-Nicols condition, in a less amount. The foreign matter detectable under the polarizing crossed-Nicols condition is determined by placing a cellulose ester film between two sheets of polarizer which are arranged vertical to each other (crossed-Nicols condition). Such foreign matter under the polarizing crossed-Nicols condition is observable in a dark visual field as a lightened spot only where the foreign matter exists, so that the size and number are easily recognized. The number of foreign matter particles observed in an area of 250 mm$^2$ under the polarizing crossed-Nicols condition is preferably not more than 200 for a particle size of 5 to 50 μm and zero for a particle size of larger than 50 μm, more preferably not more than 100 for a particle size of 5 to 50 μm, and still more preferably not more than 50 for a particle size of 5 to 50 μm.

The preparation method for the above-described cellulose ester film containing less foreign matter is not specifically limited and may be accomplished by filtering a dope composition obtained by dissolving the cellulose ester in a solvent, using the following filter paper. It is preferred to use a filter paper having a water filtration time (based on JIS P3801 7.5) of not less than 20 sec. and to perform filtration of a dope for casting under a filtering pressure of not more than 16 kg/cm$^2$. More preferably, a filter paper of less than 30 sec. under a filtering pressure of not more than 12 kg/cm$^2$ is used, and still more preferably, a filter paper of not less than 40 sec. under a filtering pressure of not more than 10 kg/cm$^2$ is used. Further, the foregoing filter paper is preferably used by layering two or more sheets. The filtering pressure is controllable by optimally selecting a filtration flow amount and filtration area.

The cellulose ester film according to the invention can be used as a member for use in liquid crystal display. The member for use in the liquid crystal display is defined as material which is used in the liquid crystal displaying device and includes a polarizing plate, protective film of a polarizing plate, phase plate, reflection plate, visual angle enhancing film, anti-glare film, anti-reflection film, non-reflection film, anti-static film or film provided with multiple functions thereof.

Among these, the invention preferably applies a polarizing plate, protective film for polarizing plate, phase plate and visual angle enlarging film in which dimensional stability is strictly required.

The preparation method of a polarizing plate according to the invention is not specifically limited and it can be prepared by any general method. There is, for example, a method in which a cellulose triacetate film is treated with alkali and is laminated by use of an aqueous solution of completely saponified polyvinyl alcohol onto both surfaces of a polarizer film made by being dipped and stretched in an iodine solution. Instead of the alkali-treatment, such methods to enhance adhesion, as described in JP-A 6-94915 and 6-118232, may be applied.

EXAMPLES

The present invention will be further explained based on examples, but the invention is not limited to these examples.

Example 1

Dope composition:

| | |
|---|---|
| Triacetyl cellulose (acetic acid content: 61.0%) | 100 parts by weight |
| 2-(2'-Hydroxy-3',5'-di-t-butylphenyl) benzotriazole | 1 part by weight |
| Additive described in Table 1 | 20 parts by weight |
| Methylene chloride | 475 parts by weight |
| Ethanol | 50 parts by weight |

The dope compositions were charged in a closed vessel, heated up to 70° C., and cellulose triacetate (TAC) was completely dissolved by stirring to obtain a dope. The time required for dissolution was 4 hrs. The dope compositions were filtered and the dope maintained at 35° C. was uniformly cast on a support of stainless steel band kept at 30° C.

Then, the dope was peeled off from the stainless band support after it was dried to such an extent as being peelable. Residual solvent in the dope was 25% at this time. The period of time required for casting to peeling of the dope was 3 min. After being peeled from a stainless support, the film was dried at 120° C. while being held in the transverse direction. Then, the transverse holding was released and drying was completed in a drying zone of 120 to 135° C., while being transported by rolls. The film was subjected to a knurling treatment to form knurs of 10 mm in width and 5 μm in height on the both edge sides of the film. Film samples were prepared having a thickness of 60 and 40 μm, respectively. The film width was 1300 mm and the wound-up length was 3000 m. The wind-up tension was set to 15 kg/1300 mm at the start and 10 kg/1300 mm at the finish.

Preparation of Polarizing Plate:

The prepared film samples were each subjected to an alkaline treatment in a 2.5 mol/l aqueous solution of sodium hydroxide at 40° C. for 60 sec., and washed with water for 3 min. to form a saponified layer to prepare an alkali-treated film.

Next, a polyvinyl alcohol film was immersed in 100 part by weight of an aqueous solution containing 1 part by weight of iodine and 4 parts by weight of boric acid, and was stretched up to 4 times at 50° C. to obtain a polarizer film. Polarizing plate samples Nos. 1 to 11 were prepared by laminating the foregoing alkali-treated film onto both surfaces of the polarizer film using an aqueous 5% completely saponified polyvinyl alcohol as an adhesive.

Comparative Example 1

Dope composition:

| Triacetyl cellulose (acetic acid content: 61.0%) | 100 parts by weight |
| 2-(2'-Hydroxy-3',5'-di-t-butylphenyl) benzotriazole | 1 part by weight |
| Triphenylphosphate | 20 parts by weight |
| Methylene chloride | 475 parts by weight |
| Ethanol | 50 parts by weight |

The dope solution of the above composition was prepared according to a method well-known in the art, filtered, and then uniformly cast at a dope temperature of 35° C. onto a support kept at 30° C. Casting onto the support was performed so that the dry film thickness was 60 μm.

Then, the dope was peeled off after being dried to an extent to peel off the dope, and further dried at 120° C. for 10 min. The resultant film was provided with a knurling of 10 mm in width and 5 μm in height on both sides of the film to prepare film samples Nos. 12 and 13 with a thickness of 60 and 40 μm respectively. The film width was 1300 mm and the wound-up length was 2000 m.

Comparative Example 2

A film sample No. 14 having a film thickness of 60 μm was prepared by casting in a manner similar to the foregoing. Procedure was in a manner similar to that of Example 1, except that the dope composition was varied, as shown below.

Dope composition:

| Triacetyl cellulose (acetic acid content: 61.0%) | 100 parts by weight |
| 2-(2'-Hydroxy-3',5'-di-t-butylphenyl) benzotriazole | 1 part by weight |
| Ethylphalylethyl glycolate | 20 parts by weight |
| Methylene chloride | 475 parts by weight |
| Ethanol | 50 parts by weight |

Comparative Example 3

A film sample No. 15 having a film thickness of 60 μm was prepared by casting in a manner similar to the foregoing. Procedure was in a manner similar to that of Example 1, except that the dope composition was varied, as shown below.

Dope composition:

| Triacetyl cellulose (acetic acid content: 61.0%) | 100 parts by weight |
| 2-(2'-Hydroxy-3',5'-di-t-butylphenyl) benzotriazole | 1 part by weight |
| Butylbenzyl phthalate | 20 parts by weight |
| Methylene chloride | 475 parts by weight |
| Ethanol | 50 parts by weight |

Procedure was in a manner similar to that of Example 4.

A film sample No. 16 having a film thickness of 60 μm was prepared by casting in a similar manner to the foregoing. Procedure was in a manner similar to that of Example 1, except that the dope composition was varied, as shown below.

Dope composition:

| Triacetyl cellulose (acetic acid content: 61.0%) | 100 parts by weight |
| 2-(2'-Hydroxy-3',5'-di-t-butylphenyl) benzotriazole | 1 part by weight |
| Compound described in JP-A 60-25053 (having structure (A) shown below) | 20 parts by weight |
| Methylene chloride | 475 parts by weight |
| Ethanol | 50 parts by weight |

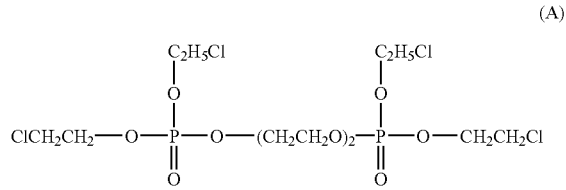

(A)

Preparation of Comparative Polarizing Plate Sample

Film samples Nos. 12 to 16 of Comparative Examples were subjected to a saponification treatment in a manner similar to that of Example 1 to prepare polarizing plates.

The prepared film samples Nos. 1 to 16 and polarizing plate samples Nos. 1 to 16 were evaluated with respect to performance in the following manner.

Evaluation method:

Evaluation of Retainability:

(1) Samples were cut to a size of 10 cm×10 cm, then, the weight was measured after being allowed to stand in an atmosphere of 23° C. and 55% RH for 24 hrs., and then the samples were further allowed to stand in an atmosphere of 140° C. for 10 min. Thereafter, the weight was measured after the samples were further allowed to stand under an atmosphere of 23° C. and 55% RH for 24 hrs. and retainability was calculated in the following manner:

Retainability (weight %)={[(weight before allowed to stand)−(weight after allowed to stand)]/(weight before allowed to stand}×100.

(2) Samples were cut to a size of 10 cm×10 cm, then, their weights were measured after the samples were allowed to stand in an atmosphere of 23° C. and 55% RH for 24 hrs. and they were further allowed to stand in an atmosphere of 80° C. and 90% RH for 48 hrs. Then, the surface of each sample was wiped slightly, and after further allowing each sample to stand at 23° C. and 55% RH for one day, the weight was measured to calculate retainability in the following manner:

Retainability (weight %)={[(weight before allowed to stand)−(weight after allowed to stand)]/(weight before allowed to stand}×100.

Measurement of Moisture Permeability

Moisture permeability of each sample was measured according to the method described in JIS Z 0208.

The temperature and humidity conditions at the time of test was Condition A described in JIS Z 0208.

| Condition A | Temperature: | 25 ± 0.5° C., |
| | Relative humidity: | 90 ± 2%. |

Dimensional Stability

Cross patterns were marked at two points (Machine Directions (MD) and longitudinal directions) on the surface of film samples, and samples were subjected to a thermal treatment (at 80° C., 90% RH, 50 hrs.), after which the distance between the marks was measured by an optical microscope.

Dimensional stability was determined according to the following equation, where $a_1$ is the distance before being subjected to the thermal treatment and $a_2$ is the distance after being subjected to the thermal treatment:

Dimensional stability (%)=$[(a_1-a_2)/a_1]\times 100$

Durability Test of Polarizing Plate

Two sheets of 10 cm×10 cm polarizing plate sample were subjected to a thermal treatment (at 80° C., 90% RH, for 50 hrs.), and the length of a white border portion around the longer center line in the longitudinal or transverse directions, when the two sheets were superposed at a right angle, was measured to determine the levels as described below. The white border portion means the state that light passes through at a border part of a polarizing plate where light should essentially not pass through when two polarizing plates were placed at a right angle to each other, and it can be determined visually. In a polarizing plate, this causes a defect which makes the displayed image at the border invisible. The results of evaluation according to the following criteria are shown in Table 1.

A: the white border portion is less than 5% (a level causing no problem as a polarizing plate), B: the white border portion is not less than 5% and less than 10% (a level causing no problem as a polarizing plate), C: the white border portion is not less than 10% and less than 20% (a level barely usable as a polarizing plate), D: the white border portion is not less than 20% and less than 50% (a level causing a problem as a polarizing plate), E: the white border portion is not less than 50% (a level not usable as a polarizing plate).

Rank C and higher ranks are levels acceptable for practical use.

TABLE 1

| Film Sample No. | Additive | Film thickness (μm) | Retainability (weight %) 140° C., 10 min. | Retainability (weight %) 80° C., 90% 48 hr | Moisture Permeability g/m²·24 hr | Dimentional Stability (%) Longitudinal Direction | Dimentional Stability (%) Lateral Direction | Durability of Polarizing Plate | Note |
|---|---|---|---|---|---|---|---|---|---|
| 1 | Rosin (KE-604) | 60 | 0.0 | 0.4 | 211 | −0.06 | −0.03 | A | Inv. |
| 2 | Rosin (KR-610) | 40 | 0.0 | 0.5 | 242 | −0.07 | −0.05 | A | Inv. |
| 3 | Rosin (KE-100) | 60 | 0.1 | 0.6 | 230 | −0.10 | −0.08 | A | Inv. |
| 4 | Rosin (KE-356) | 60 | 0.1 | 0.3 | 203 | −0.06 | −0.05 | A | Inv. |
| 5 | Rosin (G-7) | 60 | 0.2 | 0.7 | 245 | −0.09 | −0.11 | A | Inv. |
| 6 | Rosin (R-X) | 60 | 0.1 | 0.7 | 236 | −0.07 | −0.05 | A | Inv. |
| 7 | Epoxy (EPN1179) | 60 | 0.1 | 0.7 | 198 | −0.07 | −0.03 | A | Inv. |

TABLE 1-continued

| Film Sample No. | Additive | Film thickness (μm) | Retainability (weight %) 140° C., 10 min. | Retainability (weight %) 80° C., 90% 48 hr | Moisture Permeability g/m²·24 hr | Dimentional Stability (%) Longitudinal Direction | Dimentional Stability (%) Lateral Direction | Durability of Polarizing Plate | Note |
|---|---|---|---|---|---|---|---|---|---|
| 8 | Epoxy (AER260) | 60 | 0.0 | 0.7 | 205 | −0.17 | −0.13 | A | Inv. |
| 9 | Keton (Hilac 111) | 60 | 0.2 | 0.9 | 248 | −0.08 | −0.03 | A | Inv. |
| 10 | Keton (Hilac 110H) | 60 | 0.1 | 0.5 | 240 | −0.07 | −0.03 | A | Inv. |
| 11 | Paratoluenesulphonamide (Topler) | 60 | 0.3 | 1.5 | 210 | −0.77 | −0.53 | B | Inv. |
| 12 | Triphenylphosphate | 60 | 1.3 | 5.5 | 280 | −1.22 | −1.11 | E | Comp. |
| 13 | Triphenylphosphate | 40 | 1.5 | 6.7 | 310 | −1.30 | −1.06 | E | Comp. |
| 14 | Ethyl phthalilethyl glycolate | 60 | 1.2 | 4.0 | 290 | −1.34 | −1.44 | D | Comp. |
| 15 | Butyl benzyl phthalate | 60 | 2.0 | 8.3 | 330 | −2.01 | −1.81 | E | Comp. |
| 16 | Compound A | 60 | 0.2 | 5.9 | 350 | −1.01 | −0.91 | D | Comp. |

Inv.: Invention, Comp.: Comparison

As can be seen from Table 1, according to the invention, foreign matter, which causes defects in a cellulose ester film used as a protective film of a polarizing plate, were minimized in number. Durability of a polarizing plate itself was not lowered.

What is claimed is:

1. A protective film of a polarizing plate comprising a cellulose ester film, wherein a variation in a weight of the cellulose ester film is 0 to 2% under a keeping condition of 80±5° C. and 90±10% RH for 48 hours, and wherein the cellulose ester film contains a plasticizer selected from the group consisting of rosin, rosin derivatives, epoxy resins, ketone resins and p-toluenesulfonamide resins in an amount of 1 to 30 weight % of the cellulose ester film.

2. The protective film of a polarizing plate of claim 1, wherein a moisture permeability of the cellulose ester film is 50 to 250 g/m²·24 hr and a thickness of the cellulose ester film is 10 to 60 μm.

3. The protective film of a polarizing plate of claim 1, wherein the plasticizer is hydrogenated and has an acid value of 100 to 250.

4. The protective film of a polarizing plate of claim 1, wherein the plasticizer is a phenol-novolac epoxy resin or a cresol-novolac epoxy resin.

* * * * *